US012314386B2

(12) United States Patent
Orlando et al.

(10) Patent No.: US 12,314,386 B2
(45) Date of Patent: May 27, 2025

(54) CLASSIFICATION AND MITIGATION OF COMPUTE EXPRESS LINK SECURITY THREATS

(71) Applicant: Micron Technology, Inc., Boise, ID (US)

(72) Inventors: Alessandro Orlando, Milan (IT); Niccolò Izzo, Vignate (IT); Federica Cresci, Milan (IT); Angelo Alberto Rovelli, Agrate Brianza (IT); Craig A Jones, Plano, TX (US); Danilo Caraccio, Milan (IT); Luca Castellazzi, Truccazzano (IT)

(73) Assignee: Micron Technology, Inc., Boise, ID (US)

( * ) Notice: Subject to any disclaimer, the term of this patent is extended or adjusted under 35 U.S.C. 154(b) by 282 days.

(21) Appl. No.: 17/811,770

(22) Filed: Jul. 11, 2022

(65) Prior Publication Data
US 2023/0394140 A1   Dec. 7, 2023

Related U.S. Application Data

(60) Provisional application No. 63/365,666, filed on Jun. 1, 2022.

(51) Int. Cl.
*G06F 21/55* (2013.01)
*G06F 21/57* (2013.01)

(52) U.S. Cl.
CPC .......... *G06F 21/554* (2013.01); *G06F 21/575* (2013.01); *G06F 2221/034* (2013.01)

(58) Field of Classification Search
CPC . G06F 21/554; G06F 21/575; G06F 2221/034
See application file for complete search history.

(56) References Cited

U.S. PATENT DOCUMENTS

| | | | |
|---|---|---|---|
| 2007/0282951 A1* | 12/2007 | Selimis | H04L 69/08 709/205 |
| 2017/0353459 A1* | 12/2017 | Lawrence | H04L 63/0263 |
| 2020/0042715 A1* | 2/2020 | Davidi | G06F 21/572 |
| 2020/0118205 A1* | 4/2020 | Bloy | G06Q 20/3223 |
| 2020/0159969 A1* | 5/2020 | Shanbhogue | G06F 21/70 |
| 2020/0186563 A1* | 6/2020 | Convertino | G06N 20/00 |
| 2020/0280573 A1* | 9/2020 | Johnson | G06F 21/316 |

(Continued)

*Primary Examiner* — Daniel B Potratz
*Assistant Examiner* — Taylor P Vu
(74) *Attorney, Agent, or Firm* — Harrity & Harrity, LLP

(57) ABSTRACT

In some implementations, a system includes a set of servers configured to establish a set of virtual machines to provide a computing environment; a set of compute express link (CXL) interface components configured to communicate with the set of servers via a set of CXL interconnects; and a controller configured to at least one of: encrypt protocol data against a CXL interposer security threat associated with the set of CXL interconnects or a malicious extension security threat, provide a secure handshake verification of an identity of the set of CXL interface components, enforce a chain of trust rooted in hardware of the set of CXL interface components; restrict access to an area of memory of the set of CXL interface components that stores security data for verified or secured processes; or perform a security check and set up a set of security features of the set of CXL interface components.

20 Claims, 12 Drawing Sheets

(56) References Cited

U.S. PATENT DOCUMENTS

| | | | |
|---|---|---|---|
| 2020/0280578 A1* | 9/2020 | Hearty | H04L 67/535 |
| 2020/0356676 A1* | 11/2020 | Gorlamandala | G06F 21/577 |
| 2021/0185067 A1* | 6/2021 | Sureda | H04L 63/1416 |
| 2021/0216633 A1* | 7/2021 | Lee | G06F 21/6218 |
| 2021/0311643 A1* | 10/2021 | Shanbhogue | G06F 3/0622 |
| 2022/0015246 A1* | 1/2022 | Balakrishnan | H05K 1/115 |
| 2022/0255897 A1* | 8/2022 | Miele | H04L 63/1425 |
| 2022/0300608 A1* | 9/2022 | Srivastava | G06F 21/554 |
| 2023/0156034 A1* | 5/2023 | Naidoo | H04L 63/1425 726/23 |
| 2023/0177176 A1* | 6/2023 | Erickson | G06F 21/575 726/26 |

* cited by examiner

CLASSIFICATION AND MITIGATION OF COMPUTE EXPRESS LINK SECURITY THREATS

CROSS-REFERENCE TO RELATED APPLICATION

This patent application claims priority to U.S. Provisional Patent Application No. 63/365,666, filed on Jun. 1, 2022, and entitled "CLASSIFICATION AND MITIGATION OF COMPUTE EXPRESS LINK SECURITY THREATS." The disclosure of the prior application is considered part of and is incorporated by reference into this patent application.

TECHNICAL FIELD

The present disclosure generally relates to mitigation of security threats and, for example, classification and mitigation of compute express link security threats.

BACKGROUND

Memory devices may be classified as trusted devices within a computer architecture. For example, memory devices, such a dynamic random access memory (DRAM)-based memory and self-encrypting NAND solid-state drives (SSDs), may have access to various other components of a computing environment to enable the memory devices to store and/or provide data for the other components of the computing environment. Accordingly, a memory device may be a target of attack for malicious entities seeking to exfiltrate data from a computing environment that includes the memory device. Some computing environments that are subject to security threats from malicious entities include personal computers, servers, or cloud computing platforms, among other examples.

DETAILED DESCRIPTION

Figure 1:
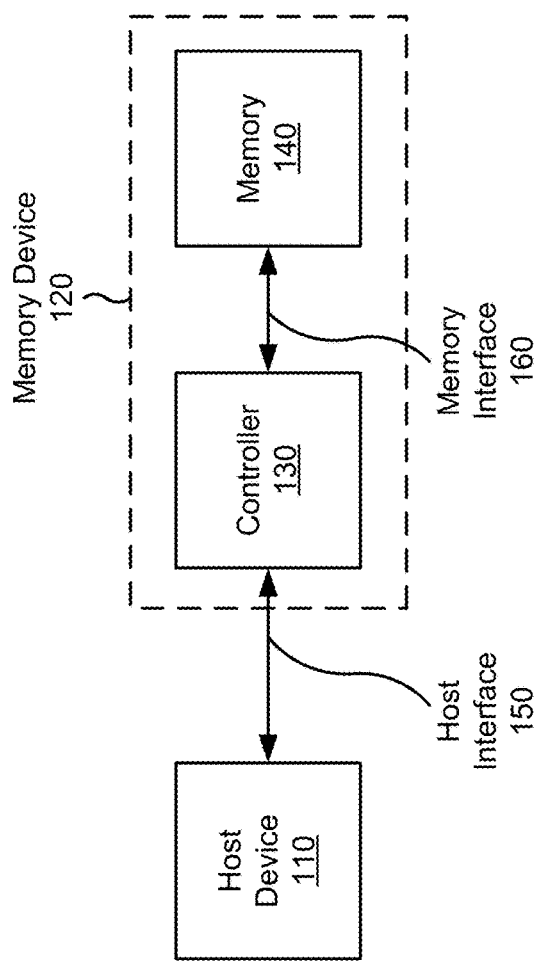
FIG. 1 is a diagram illustrating example system capable of analysis using a security analysis platform.

Malicious entities may target memory devices within a computing environment to obtain access to data within the computing environment. As an example, an attacker that is able to run code on a solid-state drive (SSD) microcontroller of an SSD in a host system may be able to directly access data of the host system, even if the data is encrypted with a Trusted Computing Group (TCG) Opal type of data encryption. If, instead, the host system implements a software encryption scheme, such as Linux Unified Key Setup (LUKS) encryption or BitLocker encryption, an attacker with control over SSD firmware may be able to perform a Row Hammer attack over direct memory access (DMA) to achieve privilege escalation on the host system. Success access to the host system may enable exfiltration of data, modification of data, or intellectual property theft, among other examples of malicious actions.

Compute eXpress Link (also rendered as "Compute Express Link" or CXL) is an emerging protocol that can harbor new and unforeseen vulnerabilities. CXL expands a peripheral component interconnect (PCI) express (PCIe) 5.0 capability by adding cache-coherent low-latency transfers to accommodate byte-addressable inter-process communication. CXL devices may be classified into, for example, three device types. The three device types may include a "type 1 CXL device," a "type 2 CXL device," or a "type 3 CXL device." Type 1 CXL devices may implement a fully coherent cache but may not have host-managed device memory. Type 2 CXL devices (e.g., cache-coherent accelerators) may implement an optional coherent cache and a host-managed device memory. Type-3 CXL devices may only have host-managed device memory. Examples of CXL type 3 devices include host managed devices used as persistent or volatile memory expanders. Due to having a trusted role in a computing system, main memory devices, such as CXL type 3 devices, are a target of security attacks.

Some methodologies have been proposed for analyzing security threats for new systems. For example, some security threat analysis methodologies include checking for errors or exceptions, incident analysis, and threat identification, among other examples. However, such methodologies may fail to analyze each possible vector for attack, assess the threats, or provide strategies for mitigating the threats. With new CXL devices being deployed it is important that security threats are identified and mitigated in a rigorous manner. Moreover, other analysis methodologies may be slow, manual, and error prone, which may result in security threats failing to be identified or mitigated.

Accordingly, some implementations described herein provide classification and mitigation of security threats, such as in CXL devices or architectures. For example, a security analysis platform may analyze a system architecture (e.g., a CXL security architecture), identify a set of threats, assess and classify the set of threats, assess and rank a set of mitigation actions, and implement one or more of the set of mitigation actions. In this way, the security analysis platform improves security for CXL devices as well as other devices that are analyzed using the security analysis platform. Some implementations described herein use security threat classification to partition security threats into analyzable groups. In this way, the security analysis platform may reduce utilization of computing resources relative to manual, linear sorting and analysis of security threats, thereby enabling use of thousands, millions, or billions of data points to train a security threat analysis model, which may result in more accurate models than using fewer data points, and more accurate security threat analysis than is achieved by manual design. Moreover, some implementations described herein provide a CXL device or CXL security architecture with improved security relative to other CXL devices or CXL security architectures, which have not been subject to analysis using the security analysis platform described herein. In this way, a CXL device or CXL security architecture described herein may improve data security for a host system or computing environment.

FIG. 1 is a diagram illustrating an example system 100 capable of analysis using a security analysis platform, as described in more detail herein. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a cloud computing environment, a data center, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

In some implementations, the host device 110 may be associated with a CXL security architecture. For example, the host device 110 may be a CXL host in communication with a CXL device (e.g., the memory device 120), such as a CXL type 3 device. In some implementations, the host device 110 may implement a Security Protocol and Data Model (SPDM) framework for exchanging application data with the memory device 120. The SPDM framework may enable the exchange of data to occur on an authenticated, encrypted, integrity-protected, and/or replay-protected basis. In this case, the host device 110 may use the SPDM framework to program CXL integrity data encryption (IDE) keys for the memory device 120 before IDE is active (e.g., to establish a secure session between the host device 110 and the memory device 120).

The memory device 120 may be any electronic device configured to store data in memory. In some implementations, the memory device 120 may be an electronic device configured to store data temporarily in volatile memory. For example, the memory device 120 may be a Random-Access Memory (RAM) device, such as a Dynamic RAM (DRAM) device or a Static RAM (SRAM) device. In this case, the memory 140 may include volatile memory that requires power to maintain stored data and that loses stored data after the memory device 120 is powered off. For example, the memory 140 may include one or more latches and/or RAM, such as DRAM and/or SRAM. In some implementations, the memory 140 may include non-volatile memory configured to maintain stored data after the memory device 120 is powered off, such as NAND memory or NOR memory. For example, the non-volatile memory may store persistent firmware or other instructions for execution by the controller 130. In some implementations, the memory device 120 may include one or more signal trace components for routing signals, such as security data. In this case, the signal trace components may be disposed in a metal layer or semiconductor layer below at least one other layer of the memory device 120. In this way, by disposing the signal trace components below a surface of the memory device 120, the memory device 120 achieves improves security relative to other devices with surface signal trace components by reducing an ability of a malicious actor to measure and access signals conveying security data, as described in more detail herein.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include a memory controller, a system controller, an ASIC, an FPGA, a processor, a microcontroller, and/or one or more processing components.

The host interface 150 enables communication between the host device 110 and the memory device 120. The host interface 150 may include, for example, a CXL interface, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface. In some implementations, the host interface 150 may be configured for in-band communication and/or out-of-band communication (e.g., using an out-of-band interface).

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

As indicated above, FIG. 1 is provided as an example. Other examples may differ from what is described with regard to FIG. 1.

Figure 2:
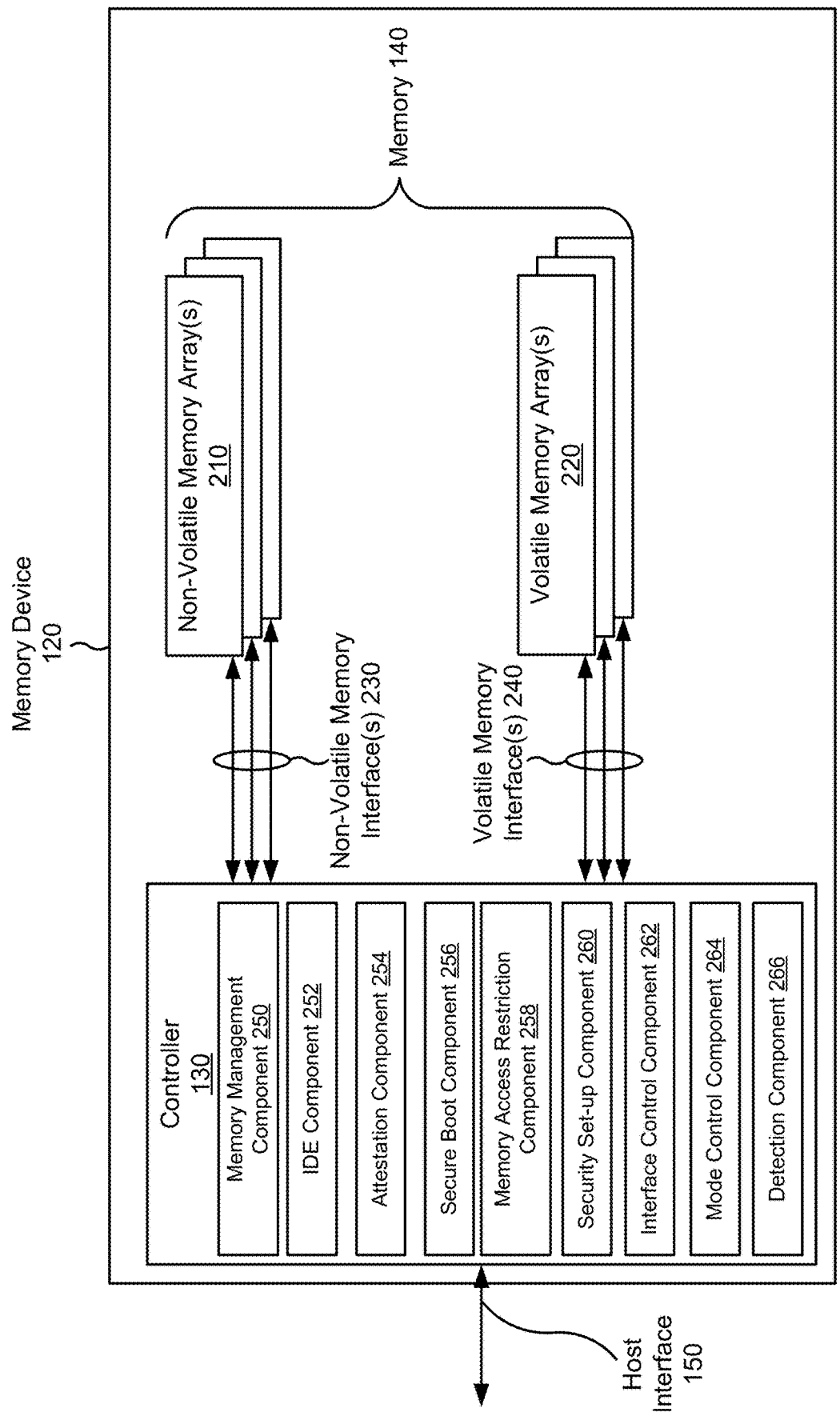
FIG. 2 is a diagram illustrating an example of components included in a memory device.

FIG. 2 is a diagram of example components included in the memory device 120 of FIG. 1. As described above in connection with FIG. 1, the memory device 120 may include a controller 130 and memory 140. As shown in FIG. 2, the memory 140 may include one or more non-volatile memory arrays 210, such as one or more NAND memory arrays and/or one or more NOR memory arrays. Additionally, or alternatively, the memory 140 may include one or more volatile memory arrays 220, such as one or more SRAM arrays and/or one or more DRAM arrays. The controller 130 may transmit signals to and receive signals from a non-volatile memory array 210 using a non-volatile memory interface 230. The controller 130 may transmit signals to and receive signals from a volatile memory array 220 using a volatile memory interface 240.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include one or more of a memory management component 250, an IDE component 252, an attestation component 254, a secure boot component 256, a memory access restriction component 258, a security set-up component 260, an interface control component 262, a mode control component 264, or a detection component 266, among other examples. In some implementations, one or more of these components are implemented as one or more instructions (e.g., firmware) executed by the controller 130. Alternatively, one or more of these components may be implemented as dedicated integrated circuits distinct from the controller 130.

The memory management component 250 may be configured to manage performance of the memory device 120. For example, the memory management component 250 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 250, such as information regarding memory block age, memory block erase count, and/or error information associated with a memory partition (e.g., a memory cell, a row of memory, a block of memory, or the like).

The IDE component 252 may be configured to encrypt protocol data against a CXL interposer security threat or a malicious extension threat. The IDE component 252 may leverage AES-GCM to protect a CXL protocol and a CXL interface being implemented by a computing environment that includes the memory device 120.

The attestation component 254 may be configured to provide a secure handshake verification of an identity of the memory device 120 against an impersonating host device. In some implementations, the attestation component 254 may implement an SPDM framework or a Device Identifier Composition Engine (DICE) architecture to provide the secure handshake verification. In this case, by implementing an attestation protocol (e.g., the SPDM framework) with a secure hardware-based cryptographic identity (e.g., using the DICE architecture), the attestation component 254 may secure a CXL interface and a CXL protocol being implemented by a computing environment that includes the memory device 120.

The secure boot component 256 may be configured to enforce a chain of trust (CoT) rooted in hardware of the memory device 120 against a malicious change or execution of code on the memory device 120. In some implementations, the secure boot component 256 may be configured to encrypt and/or decrypt a firmware image stored on or transmitted to the memory device 120. For example, during a secure boot procedure, the secure boot component 256 may decrypt the firmware image. In some implementations, the secure boot component 256 may implement Secure Boot (SB) and Secure Field Firmware Update (Secure FFU) procedures and enforce the CoT rooted in hardware of the memory device 120, thereby ensuring that only approved images are loaded during power-up (e.g., preventing loading of unapproved images or tampering with approved images). Additionally, or alternatively, the secure boot component 256 may enforce encryption and/or decryption on firmware of the memory device 120.

The memory access restriction component 258 may be configured to restrict access to an area of memory 140 that stores security data for verified or secured processes against a data exfiltration security threat and/or a data or image tampering security threat. For example, the memory access restriction component 258 may encrypt a portion of memory 140 and/or enforce security procedures on access to or modification of the portion of memory 140.

The security set-up component 260 (e.g., which may be implemented in software, hardware, a combination thereof, etc.) may be configured to perform a security self-check and set up one or more security features of the memory device 120 (e.g., against a device lifecycle type of security threat). In some implementations, the security set-up component 260 may be configured to reject a command that is not authenticated. The interface control component 262 may be configured to receive a secure command to disable a set of interfaces of the memory device 120 and to disable the set of interfaces of the memory device 120 as a response to receiving the secure command. For example, the interface control component 262 may disable a set of interfaces as a configured counter measure triggered by the detection component 266, as described herein. The mode control component 264 may be configured to switch the memory device 120 from a first mode associated with development code to a second mode associated with production code and to erase production code when transitioning to the first mode.

The detection component 266 may be configured to detect an anomaly on a power supply or a device logic and trigger a configured counter measure. For example, the detection component 266 may include a voltage detection component or an electromagnetic interference detection component. In some implementations, the detection component 266 may detect micro-probing of the memory device 120 (e.g., which may be used to read or force sensitive signals (e.g., signals associated with security operations or secure memory regions of memory 140) operating directly on an integrated circuit (IC) die of the memory device 120). Additionally, or alternatively, as described elsewhere herein, some of the sensitive signals may be restricted to layers below a surface of the IC die of the memory device 120 to prevent micro-probe-based reading or forcing of the sensitive signals. In some implementations, the detection component 266 may be configured to detect focused ion beam (FIB) usage in proximity to the memory device 120 (e.g., which can be used by a malicious actor to add traces to the memory device 120). Additionally, or alternatively, the detection component 266 may detect a usage of electromagnetic pulses or power anomalies. Based on detecting a security threat, the detection component 266 may trigger a counter-measure, such as aborting a compromised secure boot, disabling a feature (e.g., to avoid exposing secure data), or implementing or activating redundant logic controls (e.g., by using glitch resistant code), among other examples. Additionally, or alternatively, the detection component 266 may implement a counter-measure, such as a cache attack counter-measure or a Row Hammer attack counter measure (e.g., refreshing one or more victim rows or other components), among other examples.

Additionally, or alternatively, the controller 130 may include other components, such as an error correction component (not shown) that may be configured to detect and/or correct errors associated with the memory device 120. For example, an error correction component may be configured to detect and/or correct an error associated with writing data to or reading data from one or more memory cells of a memory array, such as a single-bit error (SBE) or a multi-bit error (MBE). Additionally, or alternatively, the controller 130 may include a security component (not shown) that may be configured to perform one or more security operations for the memory device 120. For example, a security component may be configured to encrypt or decrypt data, such as data read from the memory 140 and/or data to be written to the memory 140. Additionally, or alternatively, a security component may be configured to validate commands received from the host device 110, such as by validating a cryptographic signature of a command (e.g., using one or more cryptographic keys).

Figure 7:
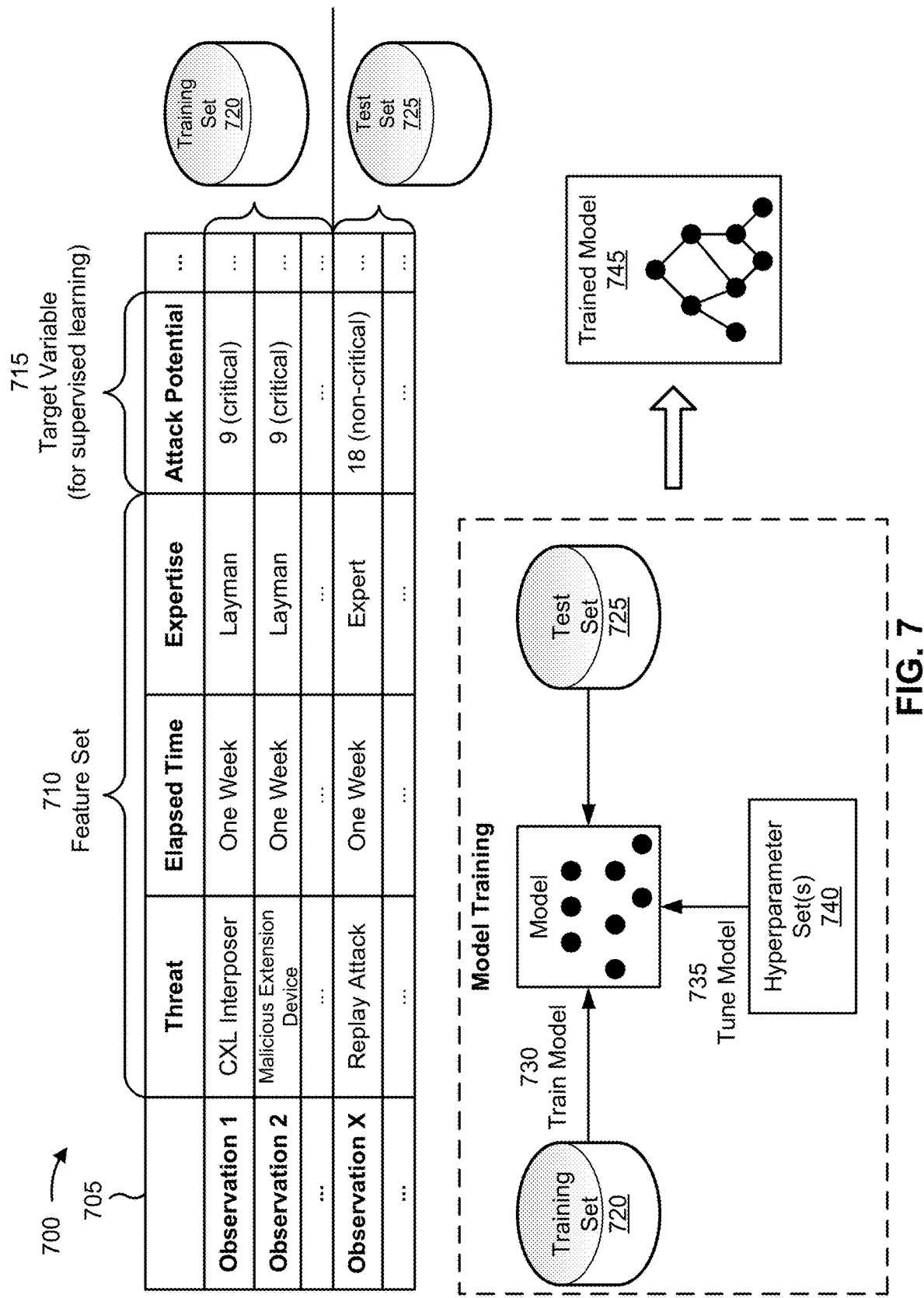
FIG. 7 is a diagram illustrating an example associated with training a machine learning model in connection with classifying and mitigating security threats.
Figure 8:
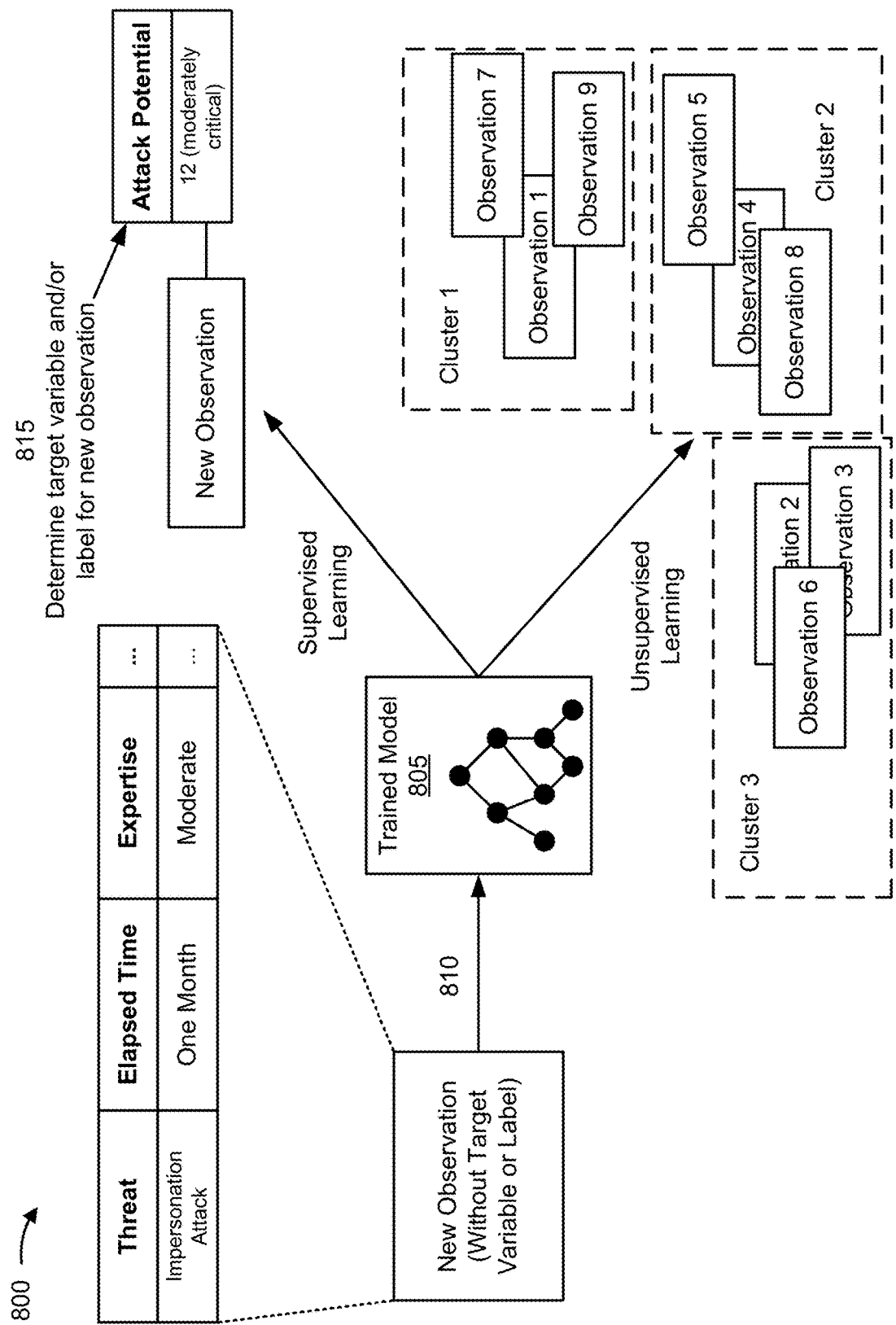
FIG. 8 is a diagram illustrating an example associated with applying a trained machine learning model to a new observation associated with classification and mitigation of security threats.
Figure 9:
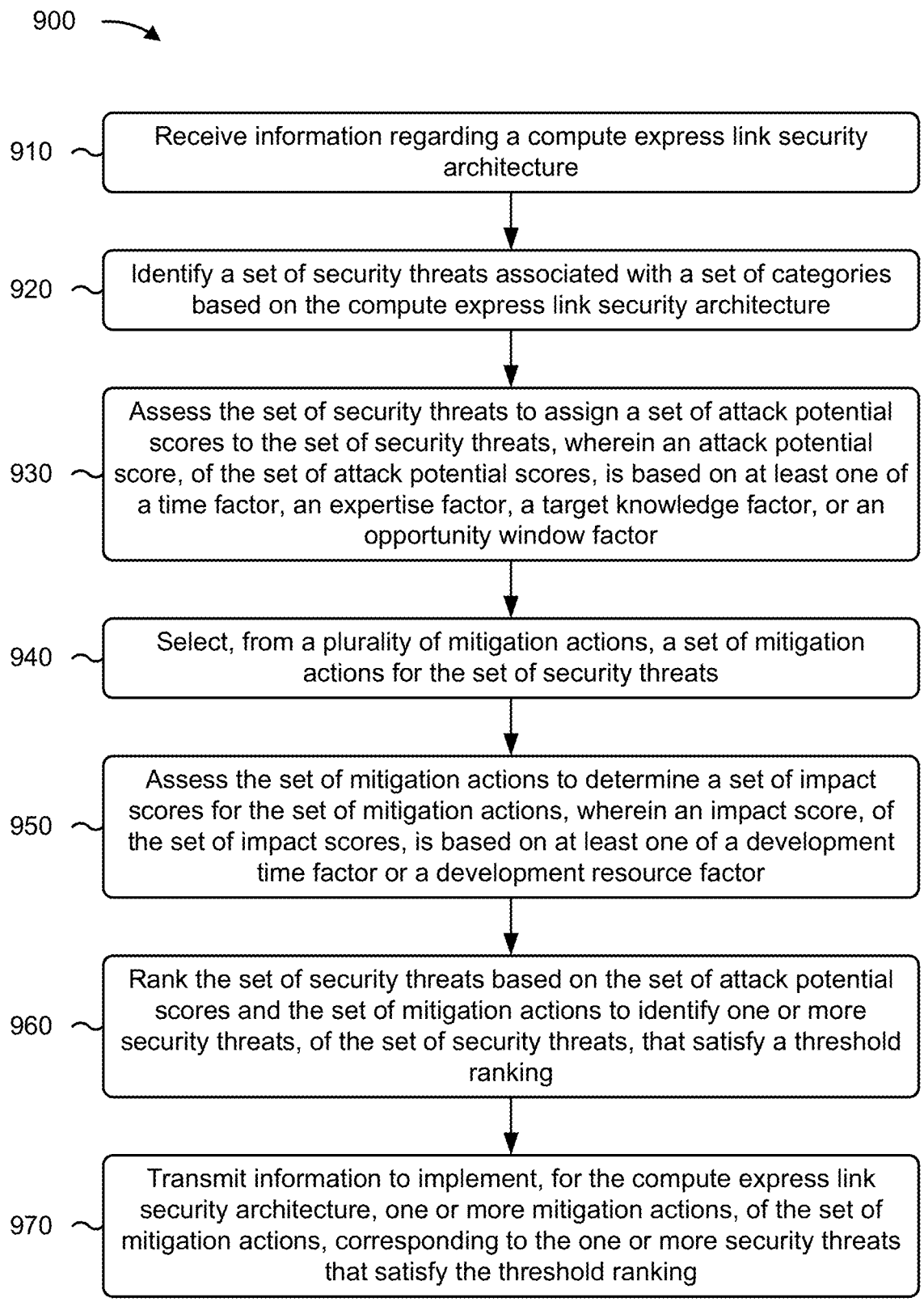
FIG. 9 is a diagram illustrating an example process associated with classification and mitigation of CXL security threats.

One or more devices or components shown in FIG. 2 may be used to carry out operations described elsewhere herein, such as one or more operations of FIGS. 3-8 and/or one or more process blocks of the methods of FIG. 9. For example, the controller 130 and/or the components thereof may perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
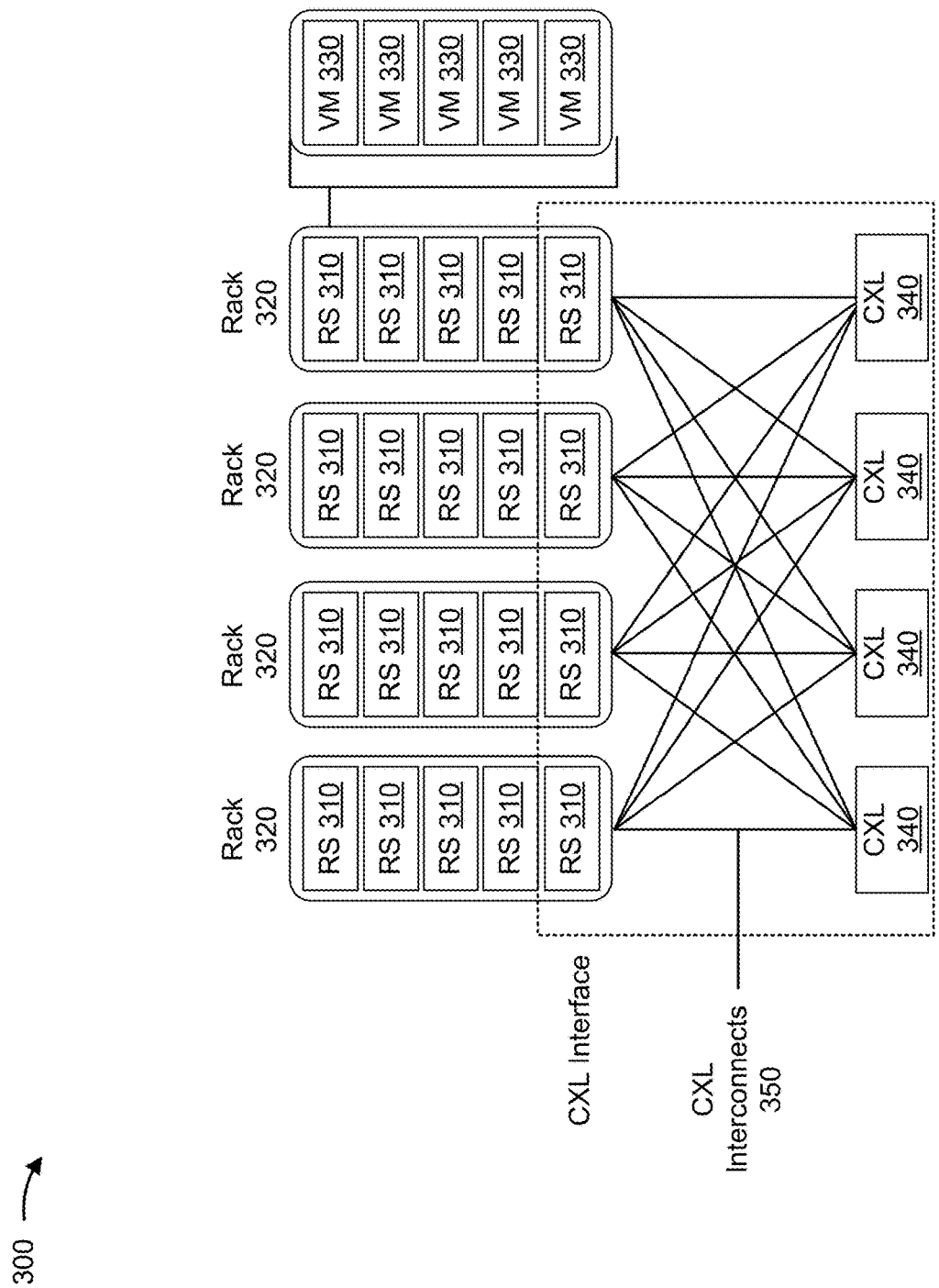
FIG. 3 is a diagram illustrating an example computing environment.

FIG. 3 is a diagram illustrating an example computing environment 300. As shown in FIG. 3, the computing environment 300 may include a set of rack servers (RSs) 310 (e.g., on a set of racks 320). A rack server 310 may provide a set of virtual machines 330 (e.g., which may be controlled and/or supported by a hypervisor and/or other virtual machine management components provided by a rack server 310) to perform computing tasks, such as processing tasks, data storage tasks, or communication tasks, among other examples. In some implementations, the computing environment 300 may include a set of CXL devices 340 connected to the set of rack servers 310 via a set of CXL interconnects 350 of a CXL interface. In this case, a CXL interface may include the set of CXL devices 340, the set of CXL interconnects 350 of the CXL interface, and one or more rack servers 310, of the set of rack servers 310, that interface with the set of CXL devices 340 via the CXL interconnects 350 of the CXL interface. Computing environment 300 may implement a CXL protocol that allows interconnection of hyperscale rack-mounted servers (e.g., rack servers 310) through a CXL fabric (e.g., a set of active switches and passive connectors) to one or more CXL devices 340. A rack server 310 may include a board management controller (BMC), which manages out-of-band telemetry and firmware updates.

Although some implementations are described herein in terms of a rack server deployment, other types of computing environments 300 are contemplated. In some implementations, the set of CXL devices 340 may correspond to a set of memory devices 120. For example, a CXL device 340 may be a memory device 120 that implements a CXL architecture. In some implementations, the set of CXL devices 340 may implement one or more data protection schemes. For example, the set of CXL devices 340 and a set of CXL hosts (e.g., on the set of rack servers 310) may implement Advanced Encryption Standard (AES) encryption with Galois/Counter Mode (GCM) (AES-GCM) to enable data confidentiality and data integrity, as described in more detail herein.

As indicated above, FIG. 3 is provided as an example. Other examples may differ from what is described with regard to FIG. 3.

Figure 4:
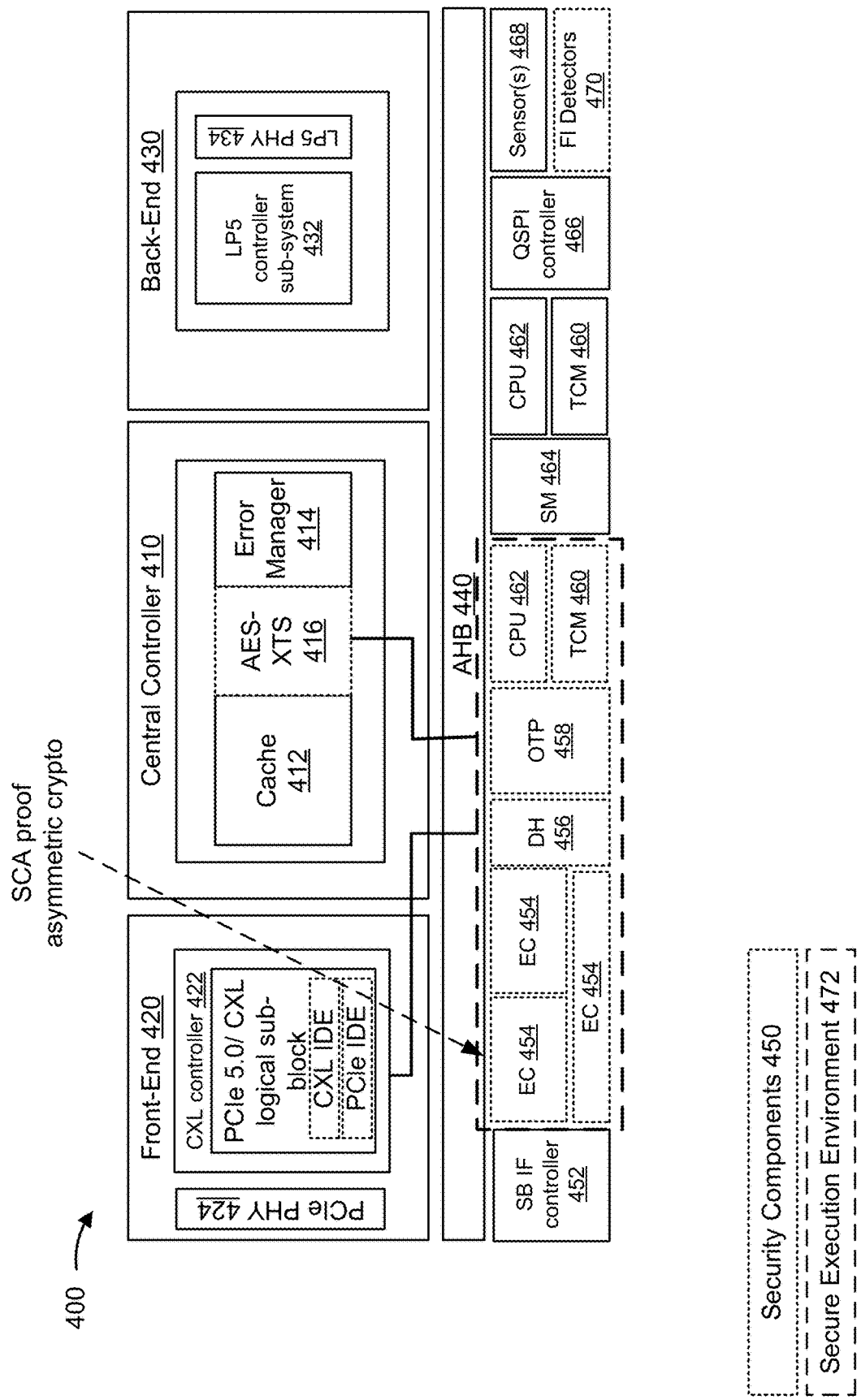
FIG. 4 is a diagram illustrating an example compute express link (CXL) security architecture.

FIG. 4 is a diagram illustrating an example CXL security architecture 400. As shown in FIG. 4, the CXL security architecture 400 may include a central controller 410, a front-end component 420, a back-end component 430, an advanced high performance bus (AHB) 440, and a set of security components 450. In some implementations, the CXL security architecture 400 may be implemented for a CXL device 340 or the memory device 120 based on an assessment of a CXL architecture as described herein with regard to FIGS. 6A-6D.

The central controller 410 may include a cache 412, an error manager 414, and an AES Xor-encrypt-xor-based tweaked-codebook mode with ciphertext stealing (XTS) (AES-XTS) component 416. The front-end component 420 may include a CXL controller 422, which includes a PCIe 5.0/CXL logical sub-block with a CXL IDE and a PCIe IDE, and a PCIe physical (PHY) interface 424. The CXL IDE may implement AES-GCM 256-bit (AES-GCM 256) encryption, in some implementations. The PCIe PHY interface 424 may implement a PCIe 5×8 link with 32 gigatransfers per second (GT/s). The back-end component 430 may include an LP5 controller sub-system 432 and an LP5 PHY interface 434. In some implementations, the LP5 controller sub-system 432 may implement a refresh management (RFM) policy.

The AHB 440 may be an interconnect bus to connect the central controller 410, the front-end component 420, and the back-end component 430 with the set of security components 450. CXL security architecture 400 may include a sideband (SB) interface (IF) controller 452 associated with a system management bus (SMBus) interface and a Joint Test Action Group (JTAG) interface. CXL security architecture 400 may include a set of encryption components 454, such as a Rivest-Shamir-Adleman (RSA)-4096 encryption component, a Secure Hash Algorithm 2 (SHA-2) hashing component, or an AES-GCM encryption component (e.g., providing firmware encryption), among other encryption components. CXL security architecture 400 may include a Diffie-Hellman (DH) component 456 (e.g., implementing the SPDM framework and enabling a DH key exchange), a one-time programming (OTP) component 458 (e.g., providing confidentiality for secure information), a set of thread cluster memory scheduling (TCM) components 460, a set of central processing units (CPUs) 462, a shared memory (SM) 464, a quad serial peripheral interconnect (SPI) (QSPI) controller 466, a set of sensors 468, and a set of fault injection (FI) detectors 470 (e.g., which may provide monitoring and detection of hardware fault injection or glitching attacks).

In some implementations, the set of encryption components 454, the DH component 456, the OTP component 458, a TCM 460, and one or more CPUs 462 may form a secure execution environment (SEE) 472. The SEE 472 may interface with the CXL IDE and PCIe IDE of the front-end component 420 and with the AES-XTS component 416 of the central controller 410, among other examples. In some implementations, the CPU 462 within the SEE 472 may execute SEE firmware to manage critical security parameters (CSPs) and provide cryptographic functionality for a DICE architecture. In contrast, the CPU 462 not within the SEE 472 may provide execution of open execution environment (OEE) firmware for device key attestation and key exchange in accordance with the SPDM framework.

As indicated above, FIG. 4 is provided as an example. Other examples may differ from what is described with regard to FIG. 4.

Figure 5:
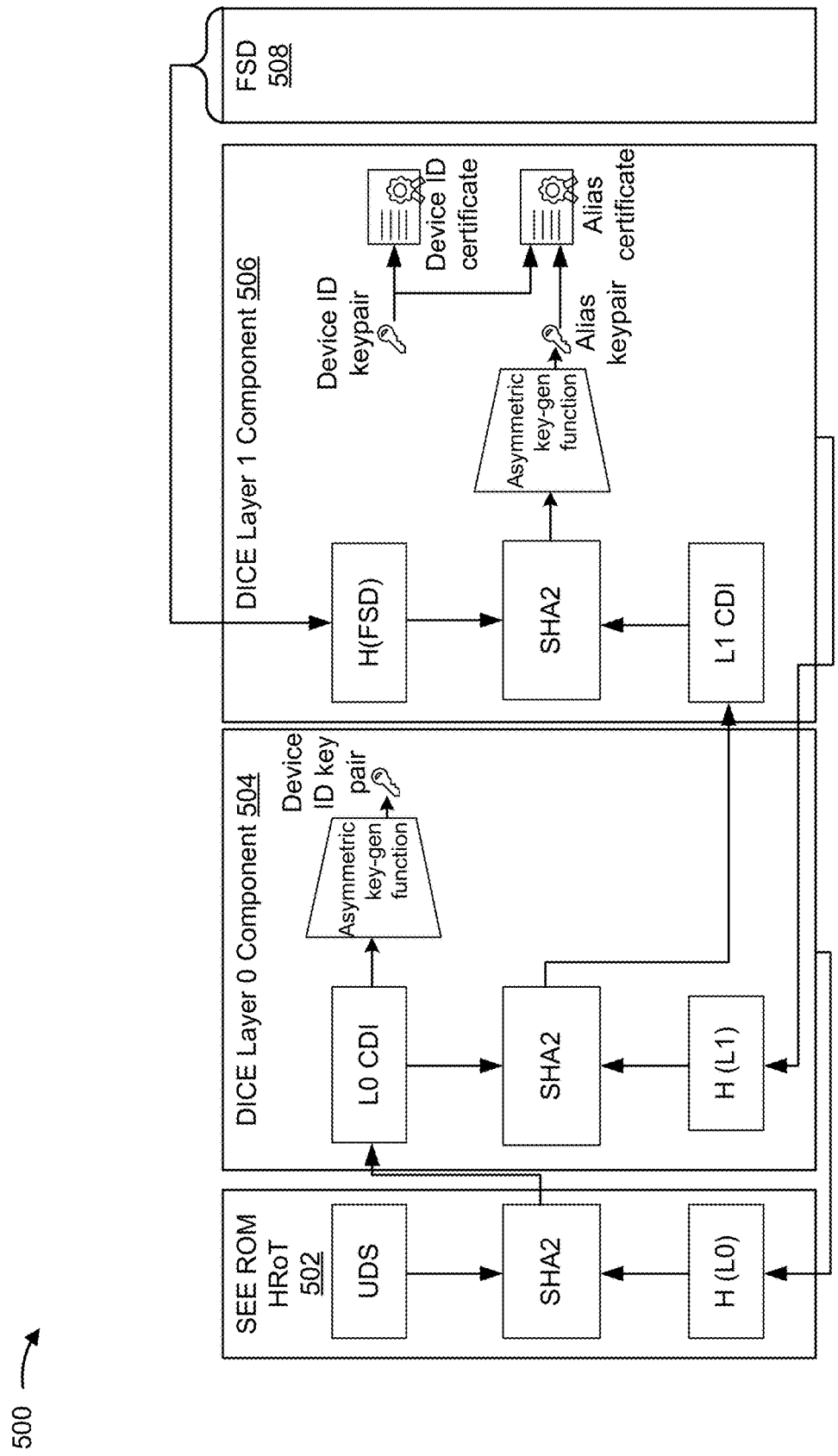
FIG. 5 is a diagram illustrating an example of a device with a device identifier composition engine (DICE) architecture.

FIG. 5 is a diagram illustrating an example of components of a device 500 with a DICE architecture (e.g., a DICE 3-layer architecture). In some implementations, the device 500 may correspond to a memory 140, a controller 130, a memory device 120, a CXL device 340, or a device with the CXL security architecture 400, among other examples. In some implementations, a DICE architecture may be implemented for a device 500 based on an assessment of a CXL architecture as described herein with regard to FIGS. 6A-6D.

As shown in FIG. 5, the device 500 may include a SEE ROM HRoT 502, a DICE layer 0 component 504, a DICE layer 1 component 506, and a firmware security descriptor (FSD) 508.

In some implementations, the device 500 may read a Unique Device Secret (UDS) from a protected location within a SEE ROM. The UDS may be a value specific to hardware of the device 500. In some implementations, the UDS may be generated externally and installed with the device 500 during manufacture or generated internally during device provisioning, such as by using a Physically Unclonable Function (PUF).

In some implementations, the device 500 may receive, at a SEE ROM hardware root of trust (HRoT) 502, a command to generate a set of certificates. The device 500 (e.g., using the SEE ROM HRoT 502) may obtain the UDS to enable generation of the set of certificates. In some implementations, the device may compute a measure of DICE layer 0 component 504. For example, the device 500 (e.g., using the SEE ROM HRoT 502) may compute a hash of the code of DICE layer 0 component 504. In some implementations, the device 500 (e.g., using the SEE ROM HRoT 502) may derive a layer 0 (L0) Compound Device Identifier (CDI) based on the UDS and the measure of DICE layer 0 component 504. The L0 CDI may be a representation of mutable code of DICE layer 0 component 504. Accordingly, different code of DICE layer 0 component 504 may result in a different L0 CDI being generated. In some implementa-tions, a CDI may represent an immutable code measurement of mutable code. The measurement is combined with the device-specific UDS, as described above, to form the CDI. Accordingly, the CDI is unique to the device 500, the cryptographic identity of the mutable code of the device 500 (e.g., mutable code of DICE layer 0 component 504), and/or configuration data of the device 500.

The device 500 may derive an asymmetric key pair based on the L0 CDI. In some implementations, the device 500 may compute a measure of DICE layer 1 component 506. In some implementations, the device 500 may derive a layer 1 (L1) CDI (e.g., at DICE layer 0 component 504, which may provide the L1 CDI to DICe L1 component 506) based on the L0 CDI and the measure of DICE layer 0 component 504. In some implementations, the device 500 may derive the L1 CDI at DICE layer 1 component 506. In some implementations, the L1 CDI may be a representation of firmware of the DICE layer 1 component 506.

The device 500 may compute a measure of FSD 508, which may be an open firmware component. For example, the device 500 may hash a set of open images of FSD 508 (e.g., code, data, or configuration information stored in or associated with FSD 508, or a portion of that code, data, or configuration information) to determine a measure of FSD 508.

The device 500 may derive an asymmetric key pair based on key material derived from the measure of FSD 508. For example, the device 500 may use an asymmetric key generation function to generate an alias key based on the key material. In this way, the alias key is linked, in connection with a CoT, to the UDS (e.g., via the L1 CDI and the L0 CDI). The device 500 may generate a set of DICE certificates. For example, the device 500 may use the device identifier (DeviceID) key pair to generate a device identifier certificate, which may be used to digitally sign one or more certificates. Additionally, or alternatively, the device 500 may use the device identifier key pair and the alias key pair to generate a signed alias certificate, which may be used to digitally sign one or more certificates.

As indicated above, FIG. 5 is provided as an example. Other examples may differ from what is described with regard to FIG. 5.

FIGS. 6A-6D are diagrams of an example 600 associated with classifying and mitigating security threats. As shown in FIGS. 6A-6D, example 600 includes a server device 602 associated with a security threat analysis system 604. The server device 602 and the security threat analysis system 604 are described in greater detail below.

Figure 6A:
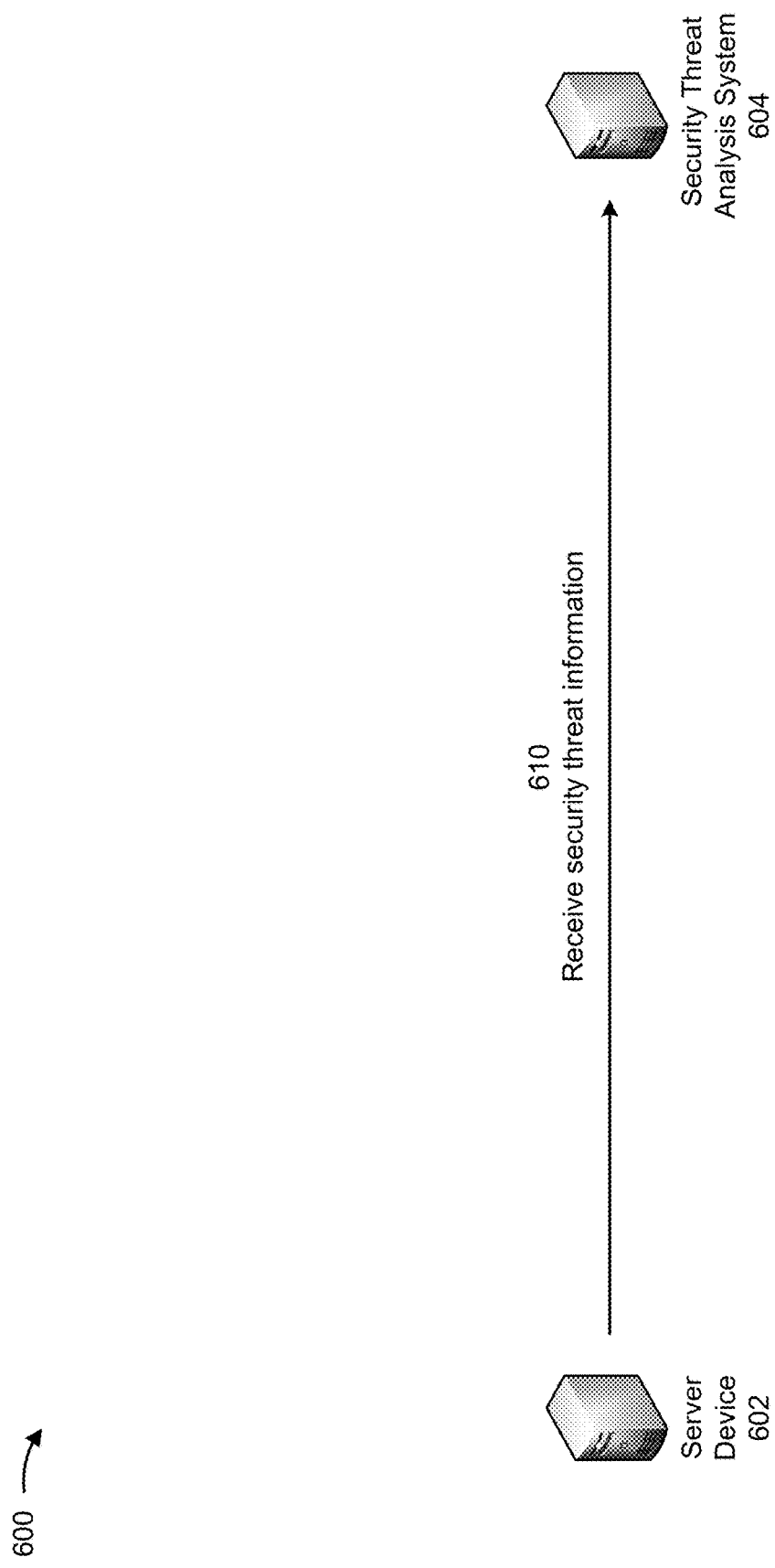
FIG. 6A-6D is a diagram illustrating an example associated with classifying and mitigating security threats.

As shown in FIG. 6A, and by reference number 610, the security threat analysis system 604 may receive security threat information associated with a device that is to be analyzed for security threats. For example, the security threat analysis system 604 may receive the security threat information from a server device 602 associated with storing data regarding prior analyses of security threats for other devices. In this case, the device under analysis may be a CXL device or another type of device.

The security threat information may include information regarding application domain threats, architecture re-use threats, asset security threats, or state-of-the-art attacks, among other examples. Application domain threats may include security threats relating to a domain where an end-system is to operate, such as feature sets, communication protocols, or technological weaknesses that can lead to security vulnerabilities. Examples of application domain threats, for a CXL device, may include CXL interposer attacks or a presence of malicious extension devices. Architecture re-use threats may include security threats relating to characteristics of inherited architecture, which can introduce security risks, such as an existence of a legacy codebase or a legacy hardware architecture (e.g., a prior or parent architecture upon which an architecture of a device under analysis is based). In other words, if a CXL device is based on a previous architecture that was subject to one or more security threats, the one or more security threats may be architecture re-use threats for the CXL device. An asset security threat category or asset-based threat may include a security threat to hardware or software assets relating to an object of interest to an attack, such as data exfiltration or tampering of confidential data (e.g., stored in connection with a CXL device), intellectual property theft, or denial of service, among other examples. Examples of asset-based threats may include security threats relating to firmware confidentiality and/or firmware integrity. State-of-the-art threats or known attack security threats may include classes or categories of security threats that have been identified at an industry or academic level (e.g., known security threats), such as software attacks and hardware attacks. Examples of state-of-the-art threats may include replay threats and impersonation threats.

In some implementations, the security threat information may include information regarding a set of devices. For example, to generate a threat analysis model or security threat assessment model, the security threat analysis system 604 may receive security threat assessment information regarding security analyses performed on a set of devices and a set of security threats that were successfully blocked by a set of mitigation actions, as well as a set of security threats that were not successfully blocked by any mitigation actions. In this case, the security threat analysis system 604 can generate the threat analysis model to identify which security threats are preventable using which mitigation actions, as described in more detail regarding FIG. 7.

Figure 6B:
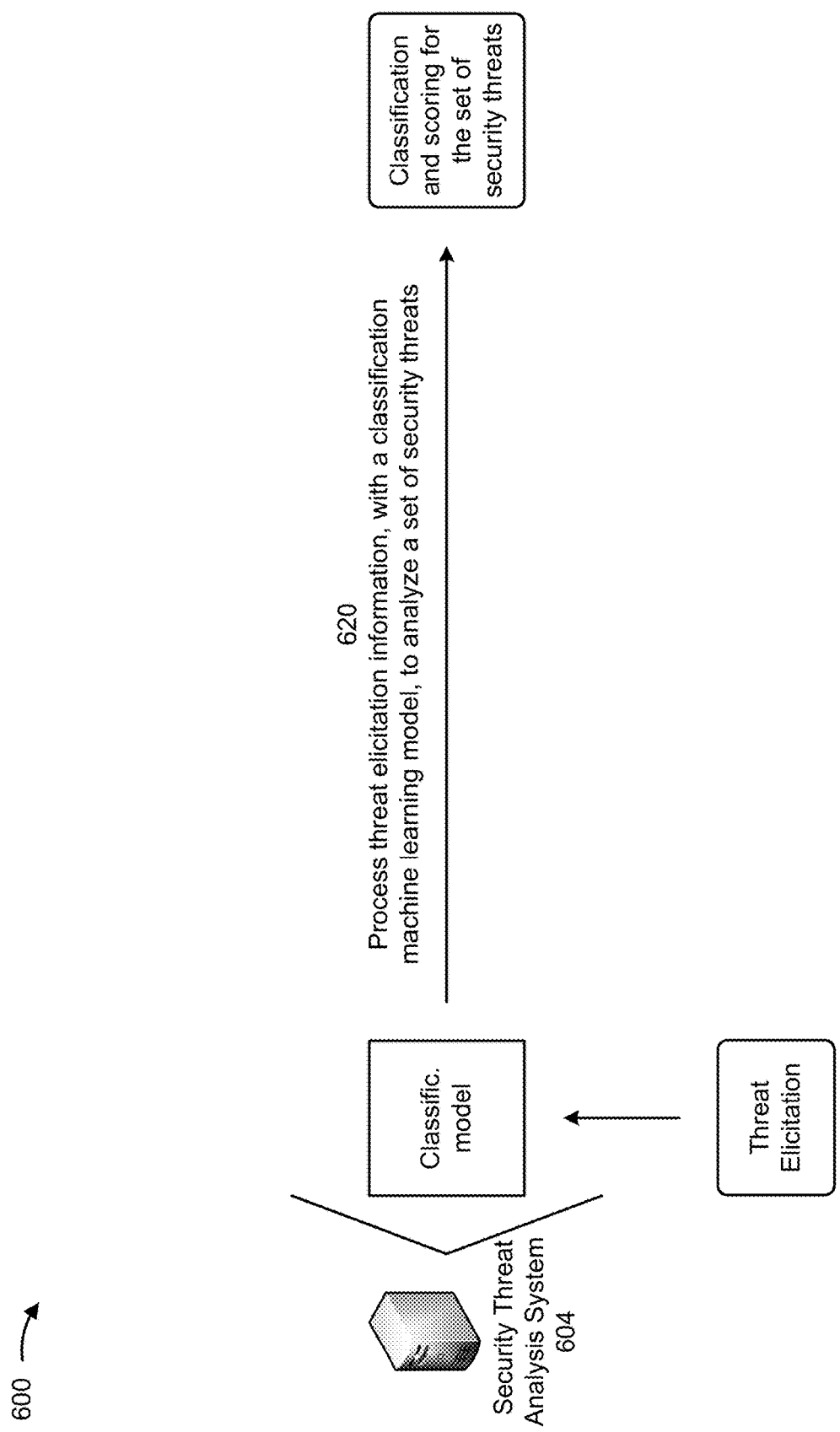

The security threat information may include threat elicitation information regarding a specific device that is to be subject to a security threat analysis. For example, the security threat analysis system 604 may receive information regarding a CXL device or a CXL security architecture for a computing environment, as described herein. In this case, the security threat analysis system 604 may perform threat elicitation, as shown in FIG. 6B. For example, the security threat analysis system 604 may use information regarding previous security threats to other devices to identify application domain security threats, architecture re-use security threats, asset-based security threats, or state-of-the-art attack based security threats for a CXL device or a computing environment that includes a CXL device.

As further shown in FIG. 6B, and by reference number 620, the security threat analysis system 604 may process the threat elicitation information, with a classification machine learning model generated based on security threat information regarding other devices, to analyze a set of security threats. For example, the security threat analysis system 604 may classify identified security threats into classes or categories (e.g., an application domain security threat category, an architecture re-use security threat category, an asset-based security threats category, or a state-of-the-art attack based security threats category).

In some implementations, security threat analysis system 604 may analyze each security threat and assign a score to each security threat based on a set of characteristics associated with each security threat. For example, the security threat analysis system 604 may use the classification machine learning model to determine an attack potential for each security threat with regard to a set of categories for attack potential. The set of categories may include an amount of time to complete an attack using a particular security threat (e.g., whether an attack can be created and completed in a day, a week, a month, etc.). The set of categories may include a level of expertise to complete an attack using a particular security threat (e.g., whether a layman, an expert, a team of experts, etc. would be required to successfully complete an attack). The set of categories may include a target knowledge to complete an attack using a particular security threat (e.g., whether knowledge of a vulnerability leading to a particular security threat is public knowledge or restricted knowledge). The set of categories may include a window of opportunity to complete an attack using a particular security threat (e.g., the attack can be completed at any time, whether the attack is restricted to certain times of a manufacturing cycle, periods of a product release cycle, or times of day). The set of categories may include an equipment category of a type of equipment that could be used to complete an attack using a particular security threat (e.g., whether standard, publicly available equipment can be used, difficult to obtain equipment can be used, or bespoke equipment is to be created).

For each category, security threat analysis system 604 may assign a score based on a similarity of a security threat to other security threats analyzed for other devices and/or a similarity of a device under analysis (e.g., a CXL device) to other devices that have been under analysis. Based on assigning scores to each category, the security threat analysis system 604 may generate a composite score and rank security threats applicable to the device under analysis. In this way, the security threat analysis system 604 may rank the set of security threats for mitigation with limited resources and/or prioritize the set of security threats for mitigation based on, for example, which security threats are most likely to occur first and/or cause the most damage to systems including a device under analysis. In this way, the security threat analysis system 604 may perform a risk assessment to expand a description of each identified threat by adding a quantitative evaluation of an associated risk for each identified threat. Furthermore, in this way, the security threat analysis system 604 ranks each threat for mitigation.

Figure 6C:
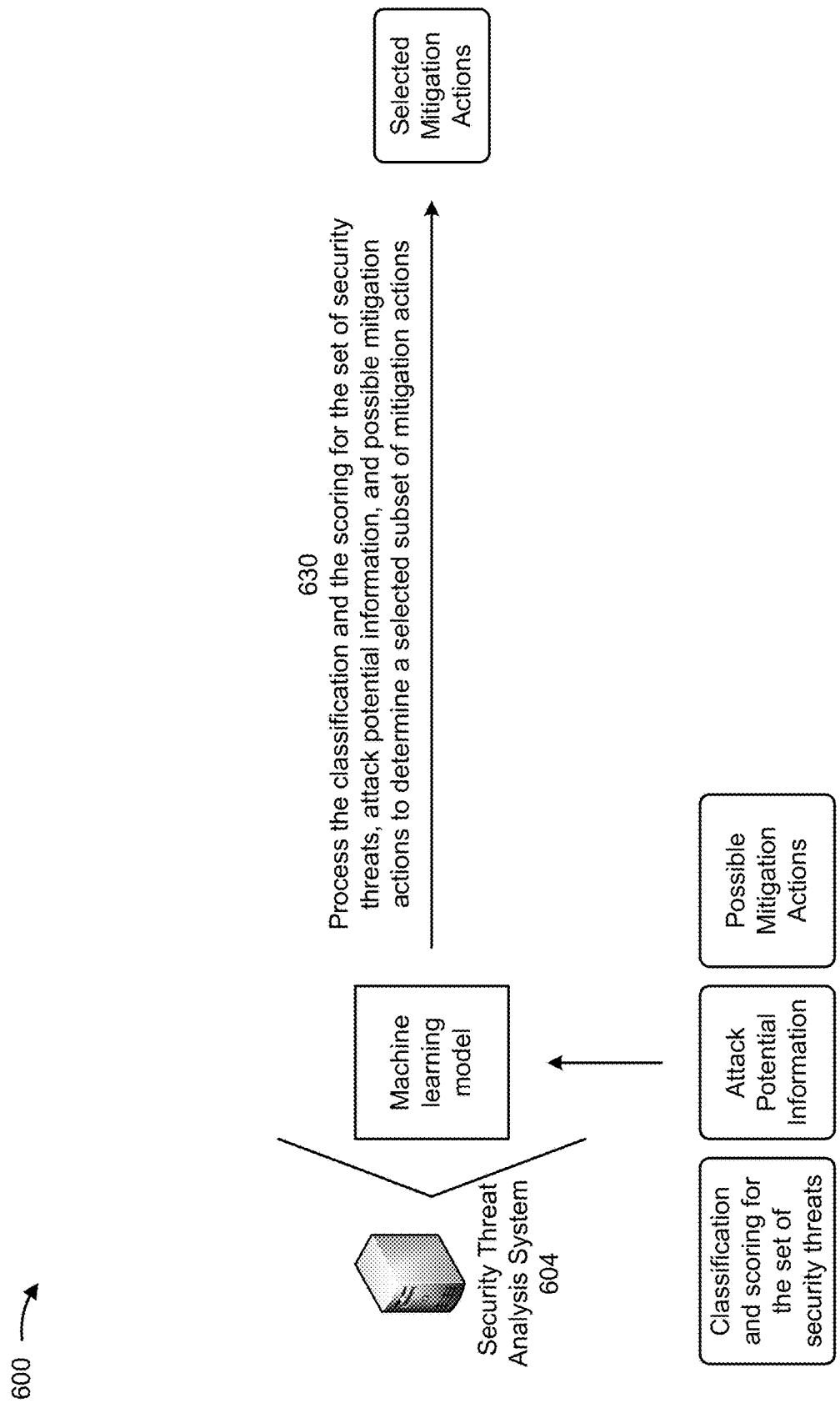

As shown in FIG. 6C, and by reference number 630, the security threat analysis system 604 may process the classification and scoring for the set of security threats, attack potential information, and information regarding a set of possible mitigation actions to select a subset of the set of possible mitigation actions. For example, the security threat analysis system 604 may use a machine learning model trained on data regarding security threats, classifications and scores for security threats, damage done by prior security threats, or an effect of mitigation actions applied to prior security threats, among other examples, to select one or more mitigation actions to implement for a device under analysis. In some implementations, the security threat analysis system 604 may receive security threat mitigation information identifying a set of potential security threat mitigation actions for assessment. The security threat analysis system 604 may generate a security threat mitigation model of effects of implementing different mitigation actions (e.g., whether different mitigation actions were successful, a cost in time of implementing different mitigation actions, a cost in resources in implementing different mitigation actions, etc.). In this case, the security threat analysis system 604 may assess and/or select one or more mitigation actions based on a result of processing security threat mitigation information using the security threat mitigation model.

Figure 6D:
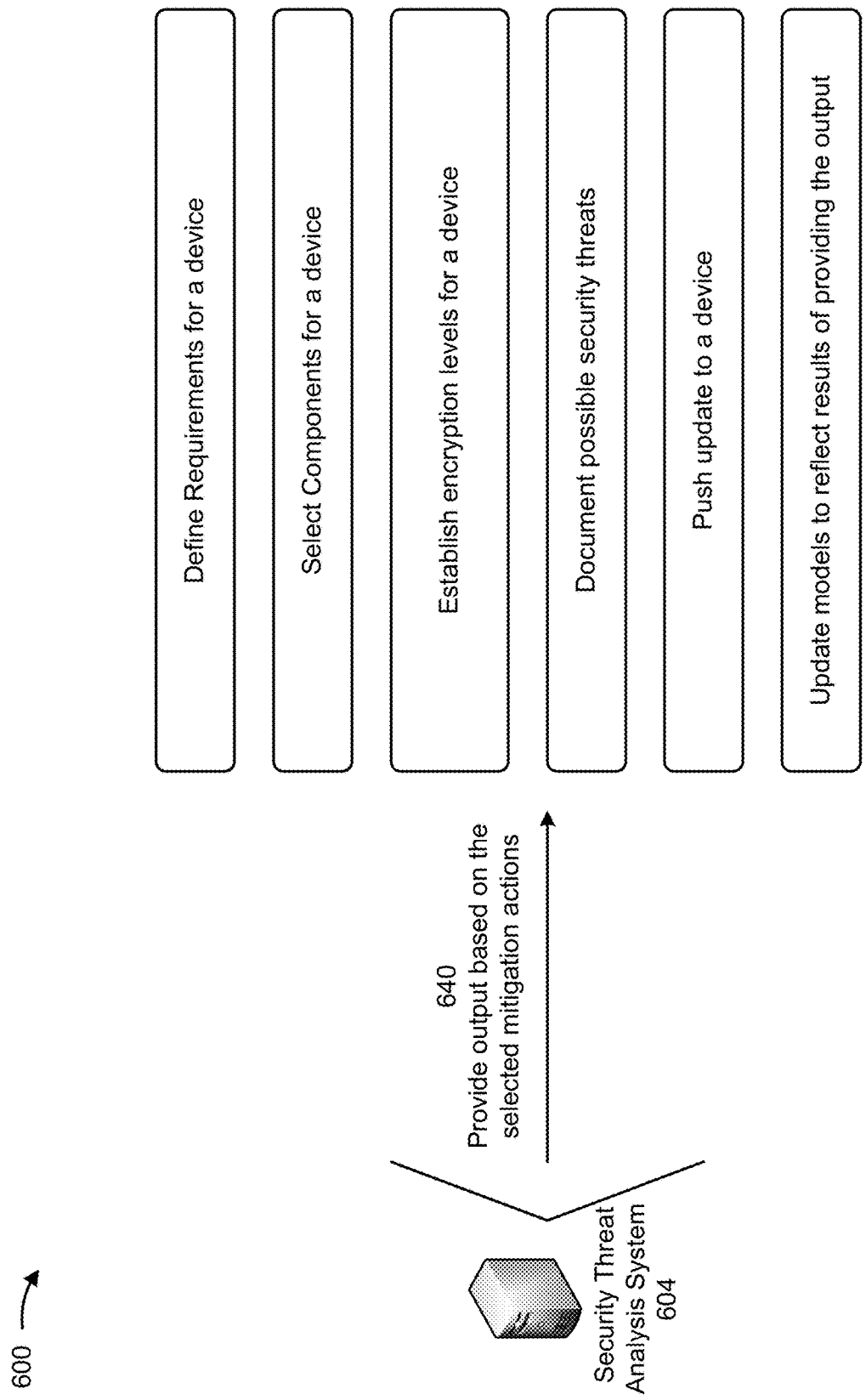

As shown in FIG. 6D, and by reference number 640, the security threat analysis system 604 may implement one or more selected mitigation actions. Some examples of mitigation actions may include configuring a particular hardware or firmware architecture (e.g., a DICE architecture or the SPDM framework), specifying a particular cryptographic engine for security, or specifying a boot flow, among other examples, as described in more detail herein. In some implementations, the security threat analysis system 604 may account for a cost of a mitigation action in determining whether to recommend a mitigation action, such as a time cost, a development cost, or a resource cost (e.g., an amount of silicon area on a chip that a particular architecture may use or a quantity of hardware components that a cryptographic engine may use), among other examples, as described in more detail herein.

In some implementations, the security threat analysis system 604 may generate a set of requirements or select a set of components for a device under analysis. For example, for a CXL device under analysis, the security threat analysis system 604 may determine that the CXL device is to implement an SPDM framework for exchanging application data in a manner that is authenticated, encrypted, integrity protected, and replay protected, as described above. The SPDM framework may be applied to programming of CXL IDE keys, such that the CXL IDE keys are encrypted before an IDE is active for the CXL device. In this way, the security threat analysis system 604 may mitigate threats relating to an intercept of application data being exchanged between a CXL device and a CXL host. Additionally, or alternatively, the security threat analysis system 604 may determine that a CXL device under analysis is to implement a layered architecture, such as a DICE architecture with DICE components, as described above. In this way, the CXL device may implement a CoT to ensure that malicious changes have not been made to code of the CXL device. In some implementations, the security threat analysis system 604 may establish a set of encryption levels for a device under analysis, such as by specifying that the device under analysis is to use a particular quantity of bits for a cryptographic key to ensure that the device under analysis is resilient to an identified security threat. For example, the security threat analysis system 604 may configure a CXL device with a particular architecture, set of components, and set of encryption levels, as described herein with regard to FIG. 4, such as configuring a CXL device to have a SEE, a set of encryption components, or a detector component, among other examples.

In some implementations, the security threat analysis system 604 may document a set of security threats. For example, the security threat analysis system 604 may output information or an alert identifying the set of security threats (e.g., security threats that have been mitigated or security threats for which a mitigation action is unavailable or infeasible). In this case, the security threat analysis system 604 may output information identifying classifications of the set of security threats, such as security threats to a CXL interface, to integrity and confidentiality, to physical integrity, to a side channel, to secret confidentiality, to a device lifecycle, or to algorithmic resistance. Additionally, or alternatively, the security threat analysis system 604 may output documentation of a security threat or a mitigation action for inclusion in a device description (e.g., of a CXL device or CXL architecture). For example, security threat analysis system 604 may output information indicating one or more security threats that were not mitigated for documentation for future mitigation attempts or actions. Additionally, or alternatively, security threat analysis system 604 may output information identifying a set of functional security conditions (e.g., security procedures) or non-functional security conditions (e.g., security components) for inclusion in a CXL device or CXL architecture, such as is described with regard to FIGS. 3-5.

In some implementations, the security threat analysis system 604 may identify one or more security threats that are identified and not mitigated but determined to be infeasible. In this case, the security threat analysis system 604 may automatically tag the one or more security threats for re-analysis at a later time to determine if the one or more security threats have become feasible (e.g., as a result of advances to equipment used to perform attacks associated with the one or more security threats) at a future time (e.g., in which case a mitigation may then be implemented).

As indicated above, FIGS. 6A-6D are provided as an example. Other examples may differ from what is described with regard to FIGS. 6A-6D.

FIG. 7 is a diagram illustrating an example 700 of training a machine learning model in connection with classifying and mitigating security threats, such as for a CXL device. The machine learning model training described herein may be performed using a machine learning system. The machine learning system may include or may be included in a computing device, a server, a cloud computing environment, a security threat analysis system 604, or the like.

As shown by reference number 705, a machine learning model may be trained using a set of observations. The set of observations may be obtained and/or input from training data (e.g., historical data), such as data gathered during one or more processes described herein. For example, the set of observations may include data gathered from a server device 602, as described elsewhere herein. In some implementations, the machine learning system may receive the set of observations (e.g., as input).

As shown by reference number 710, a feature set may be derived from the set of observations. The feature set may include a set of variables. A variable may be referred to as a feature. A specific observation may include a set of variable values corresponding to the set of variables. A set of variable values may be specific to an observation. In some cases, different observations may be associated with different sets of variable values, sometimes referred to as feature values. In some implementations, the machine learning system may determine variables for a set of observations and/or variable values for a specific observation based on input received from the server device 602. For example, the machine learning system may identify a feature set (e.g., one or more features and/or corresponding feature values) from structured data input to the machine learning system, such as by extracting data from a particular column of a table, extracting data from a particular field of a form and/or a message, and/or extracting data received in a structured data format. Additionally, or alternatively, the machine learning system may receive input from an operator to determine features and/or feature values. In some implementations, the machine learning system may perform natural language processing and/or another feature identification technique to extract features (e.g., variables) and/or feature values (e.g., variable values) from text (e.g., unstructured data) input to the machine learning system, such as by identifying keywords and/or values associated with those keywords from the text.

As an example, a feature set for a set of observations may include a first feature of a type of threat, a second feature of an amount of elapsed time, a third feature of an expertise level to carry out an attack, and so on. As shown, for a first observation, the first feature may have a value of 9 (e.g., critical), the second feature may have a value of 9 (e.g., critical), the third feature may have a value of 18 (e.g., non-critical), and so on. These features and feature values are provided as examples, and may differ in other examples. For example, the feature set may include one or more of the following features: classification, target knowledge, window of opportunity, type of equipment, or amount of damage, among other examples. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources and/or memory resources) used to train the machine learning model.

As shown by reference number 715, the set of observations may be associated with a target variable. The target variable may represent a variable having a numeric value (e.g., an integer value or a floating point value), may represent a variable having a numeric value that falls within a range of values or has some discrete possible values, may represent a variable that is selectable from one of multiple options (e.g., one of multiples classes, classifications, or labels), or may represent a variable having a Boolean value (e.g., 0 or 1, True or False, Yes or No), among other examples. In some implementations, the target variable may be a sum, average, or other mathematical operation applied to values in the feature set. In some implementations, the target variable is associated with a set of factors that contribute to attack potential, such as elapsed time, expertise, target knowledge, equipment, window of opportunity, etc., as described herein. In some implementations, an observation input may be a formal description or natural language description of a threat. In some implementations, a model may be trained using a collection of known threats that may be accessible to a system. A target variable may be associated with a target variable value, and a target variable value may be specific to an observation. In some cases, different observations may be associated with different target variable values. In example 700, the target variable is the attack potential score, which has a value of 9 (e.g., non-critical in this case) for the first observation. The attack potential may be related to an ordering of identified security threats for mitigation.

The feature set and target variable described above are provided as examples, and other examples may differ from what is described above. For example, for a target variable of a classification, the feature set may include variables relating to the device and the security threat. Similarly, for a target variable of an impact score (e.g., for a mitigation action), the feature set may include how difficult the mitigation action is to implement, how much cost the mitigation action may involve (e.g., in terms of monetary cost, size of a device, power draw, an amount of time to implement a mitigation action etc.), or an amount of damage that a security threat can cause without the mitigation action, among other examples.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model or a predictive model. When the target variable is associated with continuous target variable values (e.g., a range of numbers), the machine learning model may employ a regression technique. When the target variable is associated with categorical target variable values (e.g., classes or labels), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, or an automated signal extraction model. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 720 that includes a first subset of observations, of the set of observations, and a test set 725 that includes a second subset of observations of the set of observations. The training set 720 may be used to train (e.g., fit or tune) the machine learning model, while the test set 725 may be used to evaluate a machine learning model that is trained using the training set 720. For example, for supervised learning, the test set 725 may be used for initial model training using the first subset of observations, and the test set 725 may be used to test whether the trained model accurately predicts target variables in the second subset of observations. In some implementations, the machine learning system may partition the set of observations into the training set 720 and the test set 725 by including a first portion or a first percentage of the set of observations in the training set 720 (e.g., 75%, 80%, or 85%, among other examples) and including a second portion or a second percentage of the set of observations in the test set 725 (e.g., 25%, 20%, or 15%, among other examples). In some implementations, the machine learning system may randomly select observations to be included in the training set 720 and/or the test set 725.

As shown by reference number 730, the machine learning system may train a machine learning model using the training set 720. This training may include executing, by the machine learning system, a machine learning algorithm to determine a set of model parameters based on the training set 720. In some implementations, the machine learning algorithm may include a regression algorithm (e.g., linear regression or logistic regression), which may include a regularized regression algorithm (e.g., Lasso regression, Ridge regression, or Elastic-Net regression). Additionally, or alternatively, the machine learning algorithm may include a decision tree algorithm, which may include a tree ensemble algorithm (e.g., generated using bagging and/or boosting), a random forest algorithm, or a boosted trees algorithm. A model parameter may include an attribute of a machine learning model that is learned from data input into the model (e.g., the training set 720). For example, for a regression algorithm, a model parameter may include a regression coefficient (e.g., a weight). For a decision tree algorithm, a model parameter may include a decision tree split location, as an example.

As shown by reference number 735, the machine learning system may use one or more hyperparameter sets 740 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model. An example hyperparameter for a regularized regression algorithm includes a strength (e.g., a weight) of a penalty applied to a regression coefficient to mitigate overfitting of the machine learning model to the training set 720. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), and/or may be applied by setting one or more feature values to zero (e.g., for automatic feature selection). Example hyperparameters for a decision tree algorithm include a tree ensemble technique to be applied (e.g., bagging, boosting, a random forest algorithm, and/or a boosted trees algorithm), a number of features to evaluate, a number of observations to use, a maximum depth of each decision tree (e.g., a number of branches permitted for the decision tree), or a number of decision trees to include in a random forest algorithm.

To train a machine learning model, the machine learning system may identify a set of machine learning algorithms to be trained (e.g., based on operator input that identifies the one or more machine learning algorithms and/or based on random selection of a set of machine learning algorithms), and may train the set of machine learning algorithms (e.g., independently for each machine learning algorithm in the set) using the training set 720. The machine learning system may tune each machine learning algorithm using one or more hyperparameter sets 740 (e.g., based on operator input that identifies hyperparameter sets 740 to be used and/or based on randomly generating hyperparameter values). The machine learning system may train a particular machine learning model using a specific machine learning algorithm and a corresponding hyperparameter set 740. In some implementations, the machine learning system may train multiple machine learning models to generate a set of model parameters for each machine learning model, where each machine learning model corresponds to a different combination of a machine learning algorithm and a hyperparameter set 740 for that machine learning algorithm.

In some implementations, the machine learning system may perform cross-validation when training a machine learning model. Cross validation can be used to obtain a reliable estimate of machine learning model performance using only the training set 720, and without using the test set 725, such as by splitting the training set 720 into a number of groups (e.g., based on operator input that identifies the number of groups and/or based on randomly selecting a number of groups) and using those groups to estimate model performance. For example, using k-fold cross-validation, observations in the training set 720 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k−1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, or a standard error across cross-validation scores.

In some implementations, the machine learning system may perform cross-validation when training a machine learning model by splitting the training set into a number of groups (e.g., based on operator input that identifies the number of groups and/or based on randomly selecting a number of groups). The machine learning system may perform multiple training procedures and may generate a cross-validation score for each training procedure. The machine learning system may generate an overall cross-validation score for each hyperparameter set 740 associated with a particular machine learning algorithm. The machine learning system may compare the overall cross-validation scores for different hyperparameter sets 740 associated with the particular machine learning algorithm, and may select the hyperparameter set 740 with the best (e.g., highest accuracy, lowest error, or closest to a desired threshold) overall cross-validation score for training the machine learning model. The machine learning system may then train the machine learning model using the selected hyperparameter set 740, without cross-validation (e.g., using all of data in the training set 720 without any hold-out groups), to generate a single machine learning model for a particular machine learning algorithm. The machine learning system may then test this machine learning model using the test set 725 to generate a performance score, such as a mean squared error (e.g., for regression), a mean absolute error (e.g., for regression), or an area under receiver operating characteristic curve (e.g., for classification). If the machine learning model performs adequately (e.g., with a performance score that satisfies a threshold), then the machine learning system may store that machine learning model as a trained machine learning model 745 to be used to analyze new observations, as described below in connection with FIG. 8.

In some implementations, the machine learning system may perform cross-validation, as described above, for multiple machine learning algorithms (e.g., independently), such as a regularized regression algorithm, different types of regularized regression algorithms, a decision tree algorithm, or different types of decision tree algorithms. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 720 (e.g., without cross-validation), and may test each machine learning model using the test set 725 to generate a corresponding performance score for each machine learning model. The machine learning model may compare the performance scores for each machine learning model, and may select the machine learning model with the best (e.g., highest accuracy, lowest error, or closest to a desired threshold) performance score as the trained machine learning model 745.

As indicated above, FIG. 7 is provided as an example. Other examples may differ from what is described in connection with FIG. 7. For example, the machine learning model may be trained using a different process than what is described in connection with FIG. 7. Additionally, or alternatively, the machine learning model may employ a different machine learning algorithm than what is described in connection with FIG. 7, such as a Bayesian estimation algorithm, a k-nearest neighbor algorithm, an a priori algorithm, a k-means algorithm, a support vector machine algorithm, a neural network algorithm (e.g., a convolutional neural network algorithm), and/or a deep learning algorithm.

FIG. 8 is a diagram illustrating an example 800 of applying a trained machine learning model to a new observation associated with classification and mitigation of security threats, such as for a CXL device. The new observation may be input to a machine learning system that stores a trained machine learning model 805. In some implementations, the trained machine learning model 805 may be the trained machine learning model 745 described above in connection with FIG. 7. The machine learning system may include or may be included in a computing device, a server, or a cloud computing environment, such as the security threat analysis system 604.

As shown by reference number 810, the machine learning system may receive a new observation (or a set of new observations), and may input the new observation to the machine learning model 805. As shown, the new observation may include a first feature of type of threat, a second feature of an amount of elapsed time, a third feature of a level of expertise, and so on, as an example. The machine learning system may apply the trained machine learning model 805 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, or a classification), such as when supervised learning is employed. Additionally, or alternatively, the output may include information that identifies a cluster to which the new observation belongs and/or information that indicates a degree of similarity between the new observation and one or more prior observations (e.g., which may have previously been new observations input to the machine learning model and/or observations used to train the machine learning model), such as when unsupervised learning is employed.

In some implementations, the trained machine learning model 805 may predict a value of 12 (e.g., moderately critical) for the target variable of an attack potential for the new observation, as shown by reference number 815. Based on this prediction (e.g., based on the value having a particular label or classification or based on the value satisfying or failing to satisfy a threshold), the machine learning system may provide a recommendation and/or output for determination of a recommendation, such as to implement a secure CXL IDE. Additionally, or alternatively, the machine learning system may perform an automated action and/or may cause an automated action to be performed (e.g., by instructing another device to perform the automated action), such as updating a design specification for a CXL device to include the secure CXL IDE as a design specification for the CXL device. As another example, if the machine learning system were to predict a value of 18 for the target variable of 24 (e.g., very non-critical), then the machine learning system may provide a different recommendation (e.g., to update a design document to identify the security threat as infeasible or not to be mitigated at present) and/or may perform or cause performance of a different automated action (e.g., increasing an encryption level). In some implementations, the recommendation and/or the automated action may be based on the target variable value having a particular label (e.g., classification or categorization) and/or may be based on whether the target variable value satisfies one or more thresholds (e.g., whether the target variable value is greater than a threshold, is less than a threshold, is equal to a threshold, or falls within a range of threshold values).

In this way, the machine learning system may apply a rigorous and automated process to identifying, classifying, and mitigating security threats, such as for CXL devices. The machine learning system enables recognition and/or identification of tens, hundreds, thousands, or millions of features and/or feature values for tens, hundreds, thousands, or millions of observations, thereby increasing accuracy and consistency and reducing delay associated with identifying, classifying, and mitigating security threats relative to requiring computing resources to be allocated for tens, hundreds, or thousands of operators to manually identify, classify, and select mitigation actions using the features or feature values.

As indicated above, FIG. 8 is provided as an example. Other examples may differ from what is described in connection with FIG. 8.

FIG. 9 is a flowchart of an example method 900 associated with classification and mitigation of CXL security threats. In some implementations, a security threat analysis system (e.g., security threat analysis system 604) may perform or may be configured to perform one or more process blocks of FIG. 9.

As shown in FIG. 9, the method 900 may include receiving information regarding a compute express link security architecture (block 910). As further shown in FIG. 9, the method 900 may include identifying a set of security threats associated with a set of categories based on the compute express link security architecture (block 920). As further shown in FIG. 9, the method 900 may include assessing the set of security threats to assign a set of attack potential scores to the set of security threats, wherein an attack potential score, of the set of attack potential scores, is based on at least one of a time factor, an expertise factor, a target knowledge factor, or an opportunity window factor (block 930). In some implementations, an input for determining the set of attack potential scores may be a set of descriptions of security threats (e.g., in formal description language or natural language, from which the one or more factors may be individually derived or collectively derived). As further shown in FIG. 9, the method 900 may include selecting, from a plurality of mitigation actions, a set of mitigation actions for the set of security threats (block 940). As further shown in FIG. 9, the method 900 may include assessing the set of mitigation actions to determine a set of impact scores for the set of mitigation actions, wherein an impact score, of the set of impact scores, is based on at least one of a development time factor or a development resource factor (block 950). As further shown in FIG. 9, the method 900 may include ranking the set of security threats based on the set of attack potential scores and the set of mitigation actions to identify one or more security threats, of the set of security threats, that satisfy a threshold ranking (block 960). As further shown in FIG. 9, the method 900 may include transmitting information to implement, for the compute express link security architecture, one or more mitigation actions, of the set of mitigation actions, corresponding to the one or more security threats that satisfy the threshold ranking (block 970).

Although FIG. 9 shows example blocks of a method 900, in some implementations, the method 900 may include additional blocks, fewer blocks, different blocks, or differently arranged blocks than those depicted in FIG. 9. Additionally, or alternatively, two or more of the blocks of the method 900 may be performed in parallel. The method 900 is an example of one method that may be performed by one or more devices described herein. These one or more devices may perform or may be configured to perform one or more other methods based on operations described herein, such as the operations described in connection with FIGS. 6A-6D.

In some implementations, a compute express link device includes an integrity and data encryption (IDE) component configured with an encryption engine for encrypting protocol data against a compute express link interposer security threat or a malicious extension security threat; an attestation component configured to provide a secure handshake verification of an identity of the compute express link device against an impersonating host device; a secure boot and secure field firmware update component to enforce a chain of trust rooted in hardware of the compute express link device against a malicious change or execution of code on the compute express link device; a memory access restriction component configured to restrict access to an area of memory that stores security data for verified or secured processes against a data exfiltration security threat; and a security set-up component configured to perform a security self-check and set up a set of security features of the compute express link device against a device lifecycle type of security threat.

In some implementations, a system includes a set of servers, wherein the set of servers are configured to establish a set of virtual machines to provide a computing environment; a set of CXL interface components configured to communicate with the set of servers via a set of CXL interconnects; and a controller configured to at least one of: encrypt protocol data against a compute express link interposer security threat associated with the set of CXL interconnects or a malicious extension security threat, provide a secure handshake verification of an identity of the set of CXL interface components, enforce a chain of trust rooted in hardware of the set of CXL interface components; restrict access to an area of memory of the set of CXL interface components that stores security data for verified or secured processes; or perform a security check and set up a set of security features of the set of CXL interface components.

In some implementations, a method for mitigating security threats includes receiving, by a device, information regarding a compute express link security architecture; identifying, by the device, a set of security threats associated with a set of categories based on the compute express link security architecture; assessing, by the device, the set of security threats to assign a set of attack potential scores to the set of security threats, wherein an attack potential score, of the set of attack potential scores, is based on at least one of a time factor, an expertise factor, a target knowledge factor, or an opportunity window factor; selecting, by the device and from a plurality of mitigation actions, a set of mitigation actions for the set of security threats; assessing, by the device, the set of mitigation actions to determine a set of impact scores for the set of mitigation actions, wherein an impact score, of the set of impact scores, is based on at least one of a development time factor or a development resource factor; ranking, by the device, the set of security threats based on the set of attack potential scores and the set of mitigation actions to identify one or more security threats, of the set of security threats, that satisfy a threshold ranking; and transmitting, by the device, information to implement, for the compute express link security architecture, one or more mitigation actions, of the set of mitigation actions, corresponding to the one or more security threats that satisfy the threshold ranking.

The foregoing disclosure provides illustration and description but is not intended to be exhaustive or to limit the implementations to the precise forms disclosed. Modifications and variations may be made in light of the above disclosure or may be acquired from practice of the implementations described herein.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
training, by a device, a machine learning model associated with classifying and mitigating security threats for a compute express link (CXL) device,
wherein the machine learning model is trained using a set of observations associated with a feature set, the feature set including respective numerical values indicating:
a type of threat,
an amount of elapsed time,
an expertise level to carry out an attack,
a window of opportunity,
a type of equipment, and
an amount of damage;
receiving, by the device, information regarding a CXL security architecture;

identifying, by the device and using the machine learning model, a set of security threats associated with a set of categories based on the CXL security architecture;
assessing, by the device and using the machine learning model, the set of security threats to assign a set of attack potential scores to the set of security threats,
  wherein an attack potential score, of the set of attack potential scores, is based on at least one of a time factor, an expertise factor, a target knowledge factor, or an opportunity window factor;
selecting, by the device, using the machine learning model, and from a plurality of mitigation actions, a set of mitigation actions for the set of security threats;
assessing, by the device and using the machine learning model, the set of mitigation actions to determine a set of impact scores for the set of mitigation actions,
  wherein an impact score, of the set of impact scores, is based on at least one of a development time factor or a development resource factor;
ranking, by the device and using the machine learning model, the set of security threats based on the set of attack potential scores and the set of mitigation actions to identify one or more security threats, of the set of security threats, that satisfy a threshold ranking; and
transmitting, by the device, information to implement, for the CXL security architecture, one or more mitigation actions, of the set of mitigation actions, corresponding to the one or more security threats that satisfy the threshold ranking.

2. The method of claim 1, further comprising:
generating, for a remainder of the set of security threats other than the one or more security threats, documentation of the remainder of the set of security threats; and
outputting the documentation for inclusion in a device description of the CXL security architecture.

3. The method of claim 1, further comprising:
classifying the set of security threats into the set of categories; and
assessing the set of security threats based on classifying the set of security threats into the set of categories.

4. The method of claim 3, wherein the set of categories includes at least one of:
an application domain security threat category corresponding to a CXL interface of the CXL security architecture,
an architecture re-use security threat category corresponding to one or more portions of the CXL security architecture re-used from a parent architecture,
an asset security threat category corresponding to one or more hardware or software assets of or confidential data stored in connection with the CXL security architecture, or
a known attack security threat category corresponding to a database of identified security threats for other devices or architectures.

5. The method of claim 1, further comprising:
receiving security threat assessment information regarding a set of known security threats; and
generating a security threat assessment model based on the security threat assessment information regarding the set of known security threats; and
wherein assessing the set of security threats comprises:
  assessing the set of security threats using the security threat assessment model.

6. The method of claim 1, further comprising:
receiving security threat mitigation information regarding a set of potential security threat mitigation actions; and
generating a security threat mitigation model based on the security threat mitigation information; and
wherein assessing the set of mitigation actions comprises:
  assessing the set of mitigation actions using the security threat mitigation model.

7. The method of claim 1, further comprising:
receiving security threat mitigation information regarding a set of potential security threat mitigation actions; and
generating a security threat mitigation model based on the security threat mitigation information; and
wherein selecting the set of mitigation actions comprises:
  selecting the set of mitigation actions using the security threat mitigation model.

8. The method of claim 1, wherein the attack potential score is based on at least one of:
a type of an attack,
an amount of time to complete the attack,
an expertise to execute the attack,
a type of knowledge regarding a vector for the attack,
a window of opportunity for the attack, or
a type of equipment that is used for the attack.

9. The method of claim 1, wherein selecting the set of mitigation actions comprises:
selecting the set of mitigation actions based on an impact of an attack associated with the set of security threats.

10. The method of claim 1, wherein the set of security threats is associated with a CXL device.

11. The method of claim 1, wherein the set of security threats is associated with a computing environment that includes a set of servers, which provide a set of virtual machines, and a set of interfaces connected to the set of servers.

12. The method of claim 1, further comprising:
generating documentation of the set of security threats and the one or more mitigation actions for the one or more security threats that satisfy the threshold ranking; and
outputting the documentation.

13. The method of claim 1, further comprising:
generating a set of functional and non-functional security conditions for the CXL security architecture based on assessing the set of security threats; and
outputting the set of functional and non-functional security conditions.

14. A system, comprising:
memory; and
one or more processing components, the memory and the one or more processing components operable to cause the system to:
  train a machine learning model associated with classifying and mitigating security threats for a compute express link (CXL) device,
    wherein the machine learning model is trained using a set of observations associated with a feature set, the feature set including respective numerical values indicating:
      a type of threat,
      an amount of elapsed time,
      an expertise level to carryout an attack,
      a window of opportunity,
      a type of equipment, and
      an amount of damage;
  receive information regarding a CXL security architecture;
  identify, using the machine learning model, a set of security threats associated with a set of categories based on the CXL security architecture;

assess, using the machine learning model, the set of security threats to assign a set of attack potential scores to the set of security threats,
    wherein an attack potential score, of the set of attack potential scores, is based on at least one of a time factor, an expertise factor, a target knowledge factor, or an opportunity window factor;
select, using the machine learning model and from a plurality of mitigation actions, a set of mitigation actions for the set of security threats;
assess, using the machine learning model, the set of mitigation actions to determine a set of impact scores for the set of mitigation actions,
    wherein an impact score, of the set of impact scores, is based on at least one of a development time factor or a development resource factor;
rank, using the machine learning model, the set of security threats based on the set of attack potential scores and the set of mitigation actions to identify one or more security threats, of the set of security threats, that satisfy a threshold ranking; and
transmit information to implement, for the CXL security architecture, one or more mitigation actions, of the set of mitigation actions, corresponding to the one or more security threats that satisfy the threshold ranking.

15. The system of claim 14, wherein the memory and the one or more processing components are further operable to cause the system to:
generate, for a remainder of the set of security threats other than the one or more security threats, documentation of the remainder of the set of security threats; and
output the documentation for inclusion in a device description of the CXL security architecture.

16. The system of claim 14, wherein the memory and the one or more processing components are further operable to cause the system to:
classify the set of security threats into the set of categories; and
assess the set of security threats based on classifying the set of security threats into the set of categories.

17. The system of claim 14, wherein the memory and the one or more processing components are further operable to cause the system to:
receive security threat assessment information regarding a set of known security threats; and
generate a security threat assessment model based on the security threat assessment information regarding the set of known security threats; and
wherein assessing the set of security threats comprises:
assessing the set of security threats using the security threat assessment model.

18. The system of claim 14, wherein the memory and the one or more processing components are further operable to cause the system to:
receive security threat mitigation information regarding a set of potential security threat mitigation actions; and
generate a security threat mitigation model based on the security threat mitigation information; and
wherein assessing the set of mitigation actions comprises:
assessing the set of mitigation actions using the security threat mitigation model.

19. The system of claim 14, wherein the memory and the one or more processing components are further operable to cause the system to:
receive security threat mitigation information regarding a set of potential security threat mitigation actions; and
generate a security threat mitigation model based on the security threat mitigation information; and
wherein selecting the set of mitigation actions comprises:
selecting the set of mitigation actions using the security threat mitigation model.

20. A non-transitory computer-readable medium storing a set of instructions, the set of instructions comprising:
one or more instructions that, when executed by one or more processors of a system, cause the system to:
train a machine learning model associated with classifying and mitigating security threats for a compute express link (CXL) device,
    wherein the machine learning model is trained using a set of observations associated with a feature set, the feature set including respective numerical values indicating:
a type of threat,
an amount of elapsed time,
an expertise level to carryout an attack,
a window of opportunity,
a type of equipment, and
an amount of damage;
receive information regarding a CXL security architecture;
identify, using the machine learning model, a set of security threats associated with a set of categories based on the CXL security architecture;
assess, using the machine learning model, the set of security threats to assign a set of attack potential scores to the set of security threats,
    wherein an attack potential score, of the set of attack potential scores, is based on at least one of a time factor, an expertise factor, a target knowledge factor, or an opportunity window factor;
select, using the machine learning model and from a plurality of mitigation actions, a set of mitigation actions for the set of security threats;
assess, using the machine learning model, the set of mitigation actions to determine a set of impact scores for the set of mitigation actions,
    wherein an impact score, of the set of impact scores, is based on at least one of a development time factor or a development resource factor;
rank, using the machine learning model, the set of security threats based on the set of attack potential scores and the set of mitigation actions to identify one or more security threats, of the set of security threats, that satisfy a threshold ranking; and
transmit information to implement, for the CXL security architecture, one or more mitigation actions, of the set of mitigation actions, corresponding to the one or more security threats that satisfy the threshold ranking.

\* \* \* \* \*